April 5, 1966   H. J. LEICHNER ETAL   3,244,132
TARGET THROWING TRAP
Filed March 8, 1962   6 Sheets-Sheet 1

INVENTORS.
Howard J. Leichner,
Ernest F. Fritz,
BY Vern W. Smith,

Byron, Hume, Groen + Clement
Attys

April 5, 1966   H. J. LEICHNER ETAL   3,244,132
TARGET THROWING TRAP
Filed March 8, 1962   6 Sheets-Sheet 3

INVENTORS.
Howard J. Leichner,
BY Ernest F. Fritz,
Vern W. Smith,
Byron, Hume, Brown + Clement.
ATTYS.

April 5, 1966  H. J. LEICHNER ETAL  3,244,132
TARGET THROWING TRAP

Filed March 8, 1962  6 Sheets-Sheet 4

INVENTORS.
Howard J. Leichner,
BY Ernest F. Fritz,
Vern W. Smith,

Byron, Hume, Groen + Clement
Attys.

April 5, 1966  H. J. LEICHNER ETAL  3,244,132
TARGET THROWING TRAP

Filed March 8, 1962  6 Sheets-Sheet 5

INVENTORS.
Howard J. Leichner,
BY Ernest F. Fritz,
Vern W. Smith,

Byron, Hume, Groen + Clement
ATTYS

INVENTORS
Howard J. Leichner,
Ernest F. Fritz,
Vern W. Smith.

United States Patent Office 3,244,132
Patented Apr. 5, 1966

3,244,132
TARGET THROWING TRAP
Howard J. Leichner, Champaign, Ernest F. Fritz, Bloomington, and Vern W. Smith, Champaign, Ill., assignors, by direct and mesne assignments, to Auto Trap Shoot, Inc., a corporation of Illinois
Filed Mar. 8, 1962, Ser. No. 178,330
5 Claims. (Cl. 124—8)

This invention relates to a mechanism for throwing clay targets or "birds" and, more particularly, to a target throwing trap suitable for automatic operation.

It is an object of the present invention to provide a device for throwing clay targets or the like.

It is a further object of the present invention to provide a target throwing trap which may be simply and inexpensively constructed.

It is a further object of the present invention to provide a target throwing trap which is suitable for automatic operation.

It is a further object of the present invention to provide a target throwing trap which is automatically operated by a fluid actuation system.

It is a further object of the present invention to provide a target throwing trap suitable for throwing miniature clay targets or "birds."

It is a further object of the present invention to provide a target throwing trap for miniature clay targets or the like which is suitable for use in an indoor shooting gallery.

It is a further object of the present invention to provide a target throwing trap which is adapted to automatically feed and throw clay targets or the like for shooting practice in an indoor shooting gallery.

It is a further object of the present invention to provide means to feed a single target to a throwing arm in an automatic target throwing trap.

It is a further object of the present invention to provide means to actuate a throwing arm to pick-up and throw a clay target in a target throwing trap.

The invention, both as to its organization and method of operation, taken with further objects and advantages thereof, will best be understood by reference to the following description taken in connection with the accompanying drawings, in which:

Figure 1:
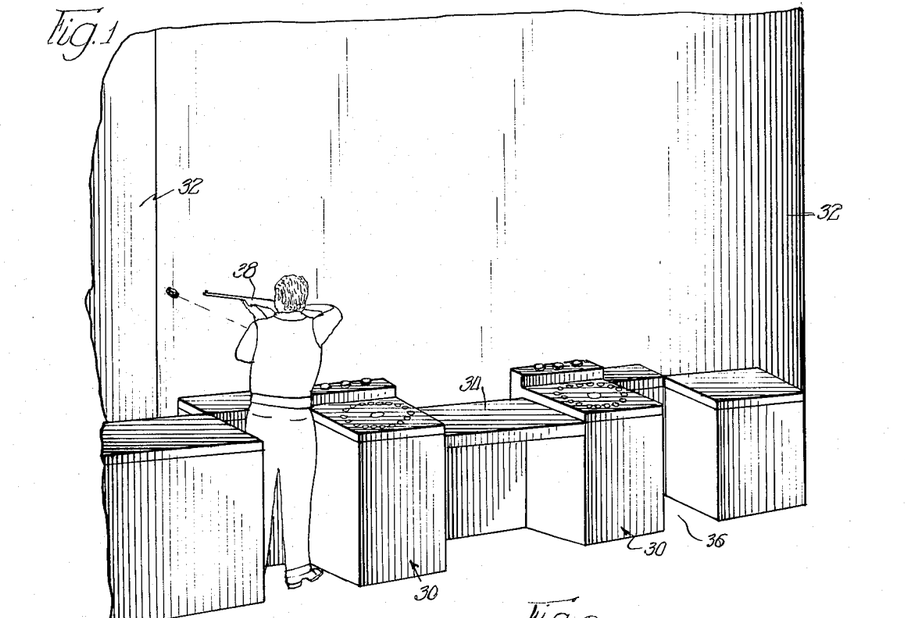
FIGURE 1 is a perspective view of an indoor shooting gallery employing the target throwing trap of the present invention.

Referring now to the drawings, and more particularly to FIGURE 1, there is illustrated an indoor shooting gallery employing the target throwing traps of the present invention, indicated generally by reference numeral 30. The indoor shooting gallery has decorated walls 32 to simulate an outdoor background where a sportsman would be hunting for pheasant, duck, rabbit and the like. The target throwing traps 30 throw clay targets or "birds," disc-shaped objects, into the shooting gallery such that the trajectory of the clay target simulates the flight of a pheasant or duck. Shooting at the clay targets while they are in flight is therefore practice for hunting pheasants, duck and the like. In fact, shooting clay targets has itself become a sport and requires a high degree of marksmanship.

The target throwing traps 30 are placed at the open end of the shooting gallery and are separated by counters 34. A shooter's zone 36 is provided adjacent each target throwing trap 30 to allow the shooter to be in proper position to shoot into the gallery at the clay targets thrown by the target throwing traps 30.

The clay targets, shot, target flight distance and the like utilized in the shooting gallery illustrated in FIGURE 1 are about one-third of the size, power and distance, respectively, of that normally employed in outdoor skeet or trap shooting. Thus, the indoor shooting gallery affords the sportsman the same practice available in outdoor trap and skeet shooting irrespective of weather conditions which may at times render outdoor skeet or trap shooting impossible. Because the target flight distance is about one-third that of outdoor skeet or trap shooting, the indoor gallery need only about 60 feet deep. This minimizes the size requirements of the building in which the indoor shooting gallery is to be installed and renders such indoor shooting galleries economically attractive.

The target throwing traps 30 in the indoor shooting gallery are automatic and coin-operated. The shooter inserts a coin in a conventional coin slot (not shown) in the target throwing trap 30 and pushes it in. Upon retraction of the coin slot, a tube is delivered which contains a predetermined number of shot cartridges. These are placed into the magazine of a gun 38. The shooter assumes his shooting position in the shooter's zone 36. He then reaches over and presses a button (not shown)

that starts the automatic target throwing trap 30. In a few seconds the first "bird" or clay target is thrown from the automatic target throwing trap 30, the shooter firing at the clay target while it is in flight. If the shooter hits the clay target it will break. The shooter reloads and waits for the next clay target which will automatically be thrown by the target throwing trap 30. Targets not hit by the shooter will be caught in a net (not shown) at the end of the shooting gallery and guided downwardly to the floor. Those unbroken targets caught in this manner will be re-used in the target throwing trap 30.

I. *General operation*

Figure 2:
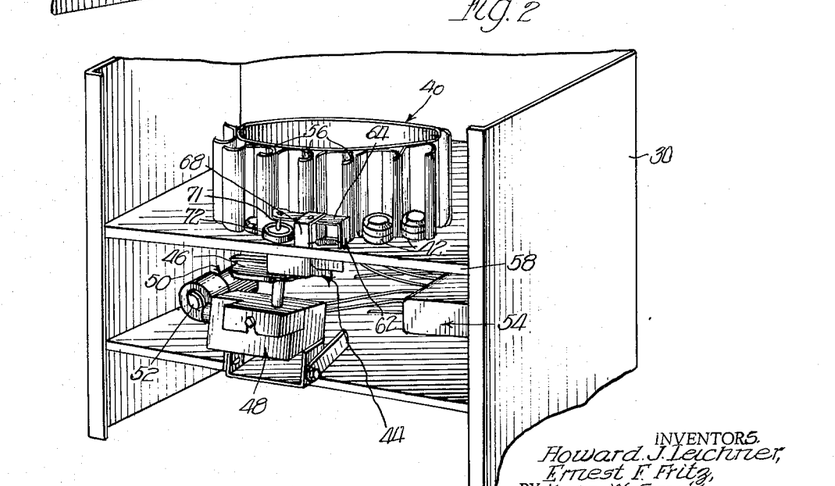
FIGURE 2 is a perspective view of the rear of the target throwing trap illustrated in FIGURE 1.

Generally speaking, the target throwing trap 30 automatically throws clay targets at predetermined intervals into the shooting gallery. As seen in FIGURE 2, it includes a rotatable magazine, indicated generally by reference numeral 40, which stores and feeds clay targets 42 one at a time to a pick-up platform, indicated generally by reference numeral 44. The magazine 40 is actuated by a hydraulically operated piston arrangement. A throwing arm 46 picks up the clay target 42 from the pick-up platform 44 and throws it from the rear of the target throwing trap 30. The throwing arm 46 is driven through a gearing arrangement, indicated generally by reference numeral 48, activated by another hydraulically operated piston arrangement. The hydraulic actuation system which controls both pistons includes a pump 50 driven by a motor 52 and a valving arrangement 54. The hydraulic actuation system activates the piston arrangements thereby synchronously controlling the magazine 40 and the gearing arrangement 48 and the throwing arm 46 in a manner more apparent hereinafter.

II. *Clay target feeding mechanism*

Figure 3:
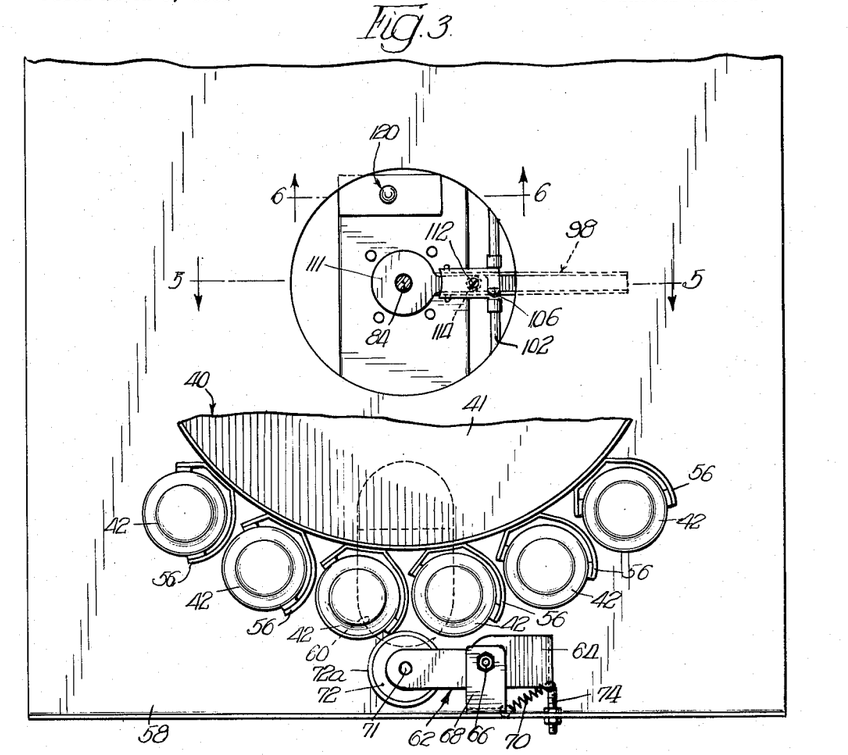
FIGURE 3 is a top view, partially cut away, of the target feeding mechanism of the target throwing trap shown in FIGURE 2.
Figure 4:
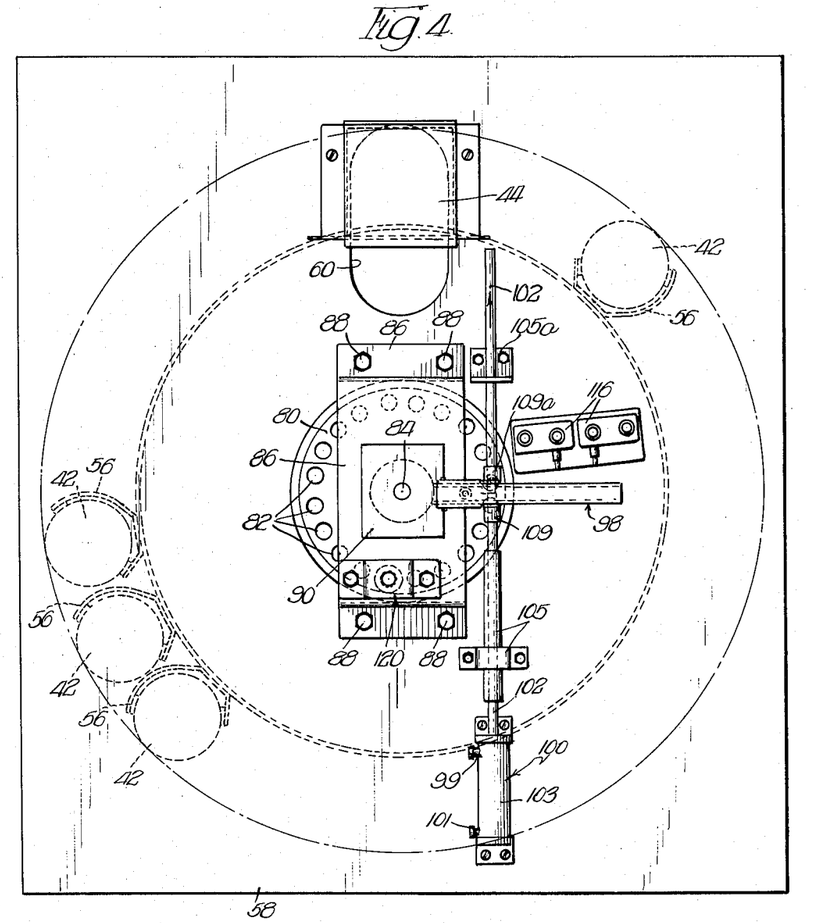
FIGURE 4 is a bottom view of the target feeding mechanism shown in FIGURE 3.

Referring now to FIGURES 2–4, the manner in which the clay targets are individually fed to the pick-up platform 44 will be described in more detail. The rotatable magazine 40 is a turret having vertical fins 56 equally spaced around its periphery to form a series of vertical chambers in which a plurality of clay targets 42 are stored in vertical stacks. The fins 56 maintain the targets 42 in vertical stacks as the magazine 40 rotates from one position to another. During rotation of the magazine 40 the stacks of targets, with the exception of one stack, rest upon a base member 58.

The base member 58 has an opening 60. Rotational movement of the magazine 40 will bring one stack of targets into alignment over this opening 60. In this manner, the bottom clay target of that stack of targets will drop through the opening 60 onto the pick-up platform 44. Each movement of the magazine 40 is a sufficient number of degrees in a clockwise direction when viewing FIGURE 3 to move the next stack of clay targets 42 into alignment with the hole 60 in the base member 58, thereby feeding another target 42 to the pick-up platform 44.

A feed control mechanism, indicated generally by reference numeral 62, assures that only one clay target 42 at a time from a stack of targets will drop through the hole 60 onto the pick-up platform 44. As seen in FIGURES 2 and 3, the feed control mechanism 62 comprises a U-shaped bracket 64 pivotally mounted about a nut and bolt arrangement 66 which extends through its legs. The nut and bolt arrangement 66 is vertically secured to a mounting means 68 affixed to the top of the base member 58. The free ends of the legs of the bracket 64 support a shaft 71 and a retainer wheel 72 which is rotatable thereon. A spring 70 is connected to the other end of the bracket 64 and the mounting means 68. The spring 70 urges the retainer wheel 72 toward the magazine 40, the retainer wheel 72 riding along the fins 56 and the clay targets 42 as they move with the magazine 40.

As the magazine 40 is rotated the bottom clay target in the stack being aligned with the opening 60 drops through the opening 60 onto the pick-up platform 44. The other clay targets in this stack are held in place as the retainer wheel 72 contacts the new bottom target of the stack and, by means of the force transmitted from the spring 70, holds it in the magazine 40. Upon the next rotation of the magazine 40 the stack of clay targets 42 which were over the opening 60 is then passed to a position over the base member 58 and the adjacent stack of targets is brought into alignment with the opening 60. In this manner only one clay target at a time drops from the magazine 40 onto the pick-up bottom 44.

It will be understood that the clay targets 42 are relatively fragile, as they have been made to break when contacted by pellets shot from a gun. Though they are strong enough to withstand ordinary handling they will break if too much pressure is exerted upon them by the retainer wheel 72. Though breakage of the targets may be prevented by the proper selection of the spring 70, additional precautions are provided within the feed control mechanism 62. An adjustable stop member 74 is positioned to abut the end of the bracket 64 connected to the spring 70. The stop member 74 prevents the retainer wheel 72 from exerting too large a pressure on the clay target. In addition, the retainer wheel 72 preferably has its periphery coated with a resilient material such as rubber or the like. This also improves the ability of the wheel 72 to hold the target in the magazine 40.

Referring now to FIGURES 3–6, the manner in which the magazine 40 is automatically rotated through an arc to move one stack of clay targets from over the opening 60 and to move the adjacent stack of clay targets into alignment over the opening 60 will be described in more detail. The magazine 40 has a base 41 having a plate 80 secured to the bottom thereof. The plate 80 has a plurality of vertically disposed holes 82 having centers disposed on the periphery of a circle having the same center as the magazine 40. A spacer hub 92 is affixed centrally to the bottom of the plate 80. The holes 82 in the plate 80 provide the means by which the magazine 40 is driven and stopped to successively align vertical stacks of clay targets 42 with the opening 60 in the base member 58.

The magazine 40 is rotatably mounted upon the base member 58. A shaft 84 is supported by a bracket 86 secured to the base member 58 by nuts and bolt arrangements 88 or the like. Secured to the bottom of the bracket 86 is a shaft support 90, the lower end of the shaft 84 being welded into a hole in the shaft support 90 whereby it is rigidly secured in a vertically disposed position. The shaft 84 extends through central holes in the spacer hub 92 affixed to the plate 80 and the base 41 of the magazine 40. The magazine 40 is rotatably secured to the shaft 84 by a screw member 94 having a set screw 96 which bears against the shaft 84 to prevent the screw member 94 from being loosened as the magazine 40 rotates about the shaft 84.

Figure 5:
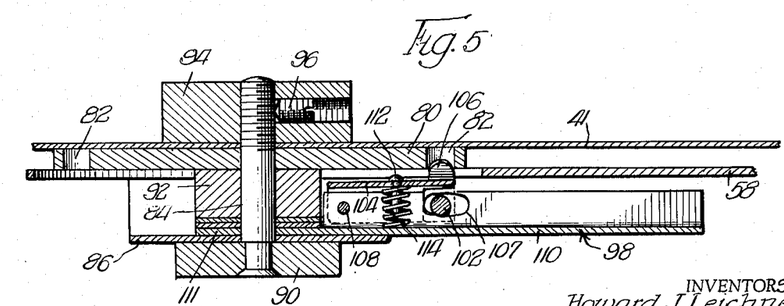
FIGURE 5 is a cross-sectional view of the driving arm of the target feeding mechanism shown in FIGURE 3, this view being taken along line 5—5 of FIGURE 3.
Figure 6:
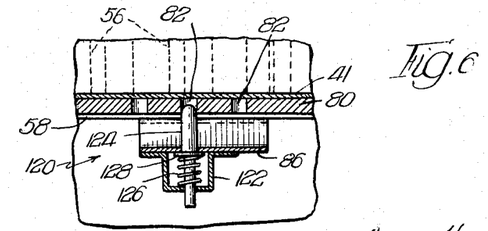
FIGURE 6 is a fragmentary cross-sectional view of the stop mechanism of the target feeding mechanism shown in FIGURE 3, this view being taken along line 6—6 of FIGURE 3.

The magazine 40 is rotated about the shaft 84 by a driving arm 98, a detail drawing of which is seen in FIGURE 5. The driving arm 98 comprises two spring biased pivotally mounted U-shaped members, the actuation member 110 and the catch member 104. The actuation member 110 has a washer-like flange 111 secured to one end through which the shaft 84 extends whereby the driving arm 98 is pivotable about the shaft 84. The legs of the U-shaped actuation member 110 extend upwardly into and between the legs of the inverted catch member 104. A horizontally disposed pin 108 is secured to the legs of the catch member 104 and extends through holes (not shown) in the legs of the actuation member 110. In this manner the catch member 104 may pivot about the axis of the pin 108. Interposed between the catch member 104 and the actuation member 110, in spaced relation from the pin 108, is a spring 114 held in position by a screw 112 or the like secured to the catch member 104. The spring 114 urges the free end of the catch member 104 to pivot away from the actuation member 110.

The end of the catch member 104 being urged away from the actuation member 110 has thereon an upwardly inclined finger or projection 106 which will fit into a hole 82 of the plate 80 when aligned therewith. The finger 106, which in this instance is integral with the catch member 104, is upwardly inclined in the direction in which the magazne 40 is to be driven, which is in a clockwise direction when viewing FIGURE 3. Thus when the driving arm 98 moves to drive the magazine 40, the finger 106 catches in a hole 82 causing the plate 80 and the magazine 40 to rotate. Likewise when the driving arm 98 is retracted prior to the next driving stroke, the finger 106 will slide out of the hole 82 by virtue of its inclined shape and move in the reverse direction to be in a position to catch in another hole 82 during the next driving stroke of the driving arm 98. The spring 114 assures that the finger 106 will catch in the hole 82 when the driving arm 98 is performing a driving stroke, i.e., moving in a clockwise direction when viewing FIGURE 3.

The driving arm 98 is actuated by a hydraulically operated piston arrangement 100. The piston arrangement includes a cylinder 103 having inlets 99 and 101 positioned on opposite sides of the piston (not shown) which reciprocates within the cylinder 103. The piston is connected to a piston shaft 102 which extends from the cylinder 103 and is supported by bearings 105 and 105a. The piston shaft extends through elongated holes 107 (FIGURE 5) in the legs of the actuation member 110 of the driving arm 98. Collars 109 and 109a (FIGURES 3 and 4) are secured to the piston shaft 102 on opposite sides of the actuation member whereby movement of the piston shaft 102 in either direction causes one of the collars 109 and 109a to force the driving arm 98 to rotate about the shaft 84.

During the driving stroke fluid under pressure enters the cylinder 103 through the inlet 101 causing the piston and piston shaft 102 to move in the direction indicated by the arrow in FIGURE 4. This causes the driving arm 98 to rotate in a clockwise direction when viewing FIGURE 3 and in a counterclockwise direction when viewing FIGURE 4. During such movement of the driving arm 98 the finger 106 engages a hole 82 and drives the magazine 40 through an arc whereby the next stack of targets 42 is aligned with the opening 60 in the base member 58, at which time one target will drop from this stack onto the pick-up platform 44. As the piston completes its driving stroke, the driving arm 98 contacts limit switches 116 secured to the bottom of the base member 58 (FIGURE 4). This actuates the valving arrangement 59, which will be discussed in more detail hereinafter, whereby the piston is moved to effect the retraction stroke.

During the driving stroke of the piston, the inlet 99 serves as an outlet for the fluid displaced by the movement of the piston in the cylinder 103. However during the retraction stroke, fluid under pressure enters the cylinder 103 through the inlet 99 to force the piston in the opposite direction. In this instance displaced fluid leaves the cylinder 103 via the inlet 101. The movement of the piston during the retraction stroke is limted by the collar 109 coming into contact with the bearing 105. During retraction the finger 106 is brought back into engagement with another hole 82 whereby the driving stroke of the piston causes the magazine 40 to again be rotated through an arc which will align another stack of targets 42 with the opening 60. Control means not pertinent to the present invention initiate the driving stroke discussed hereinbefore.

To assure that the magazine 40 does not rotate more than necessary to bring the next stack of clay targets in alignment with the opening 60 a detent, indicated generally by reference numeral 120, is provided in the base member 58. The detent 120 is illustrated in detail in FIGURE 6. A bracket 122 is secured to the bottom of the bracket 86. A pin 124 having a rounded end which engages the holes 82 extends through a hole in the bracket 86 and a hole in the bracket 122. A spring 126 is positioned between the bracket 122 and a flange or washer 128 on the pin 124. The spring 126 urges the pin 124 upwardly into any hole 82 with which it may be aligned. The end of the pin 124 which extends into the hole 82 is rounded such that the magazine 40 may be rotated when the driving arm 98 is going through its driving stroke, but will stop the magazine 40 after the driving arm 98 has completed its driving stroke. In this manner rotational momentum of the magazine 40 may not carry it past the opening 60. Likewise, the detent 120 holds the magazine 40 as the driving arm 98 and piston are being retracted prior to the next driving stroke.

III. *Throwing arm and pick-up platform*

Figures 7, 16:
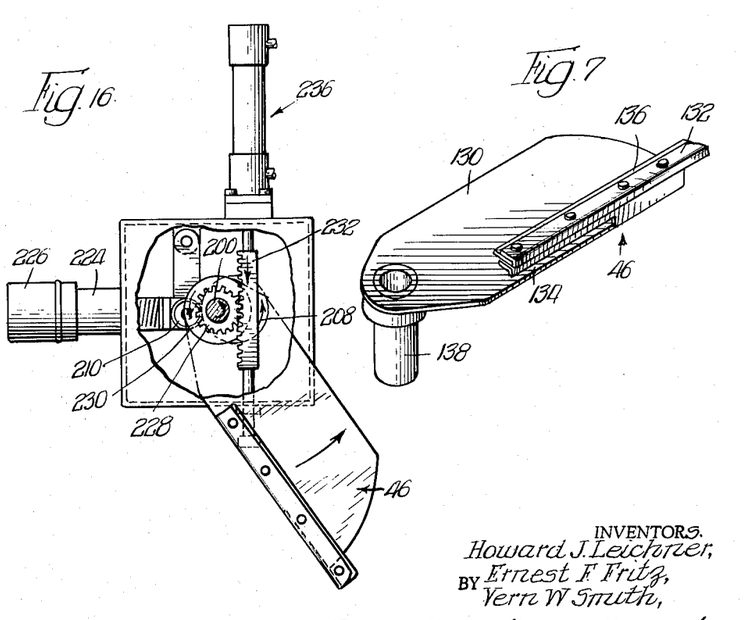
FIGURE 7 is a perspective view of the throwing arm employed in the target throwing trap of FIGURE 2.
FIGURE 16 is a top view of the gearing arrangement of FIGURE 10 illustrating the position of its components as the throwing arm completes its throwing cycle.

The throwing arm 46 is illustrated in FIGURE 7. It includes an elongate main member 130 upon which the target 42 will rest as it is being thrown. Toward one end of a longitudinal trailing edge of the main member 130 there is secured thereto a pick-up arm 132. A resilient piece of rubber 136 or the like is secured in the pick-up arm 132 to assist in holding the target upon the throwing arm 46 before it is hurled away from the trap. A slot 134 is provided between the main body 130 and the pick-up arm 132 to allow the former to pass below and the latter to pass above the pick-up platform 44 as the target is picked up by the throwing arm 46.

The other end of the main body 130 has a collar 138 secured thereto which is adapted to cooperate with the gearing arrangement 48 which rotates the throwing arm 46 to effect pick-up and throwing of the target 42.

Figure 8:
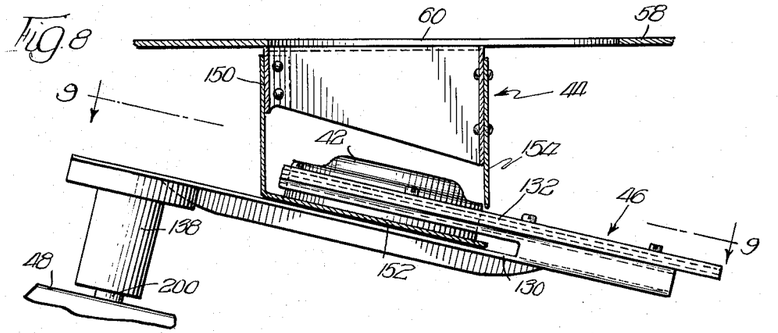
FIGURE 8 is a side, partially cross-sectional view illustrating the cooperation between the pick-up platform and the throwing arm in the target throwing trap of FIGURE 1.
Figure 9:
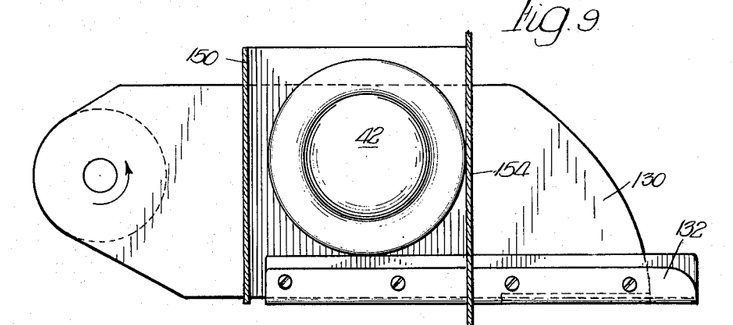
FIGURE 9 is a top cross-sectional view taken along line 9—9 of FIGURE 8.

More specifically the manner in which the throwing arm 46 cooperates with the pick-up platform 44 is illustrated in FIGURES 8 and 9. Generally speaking the pick-up platform 44 comprises a rectangular housing attached to the bottom of the base member 58 and communicating with the opening 60. A back side 150 of the housing has attached thereto a platform plate 152 on which the target 42 drops from the magazine 40. The platform plate 152 is inclined downwardly toward the forward side 154 of the housing. The forward side 154 of the housing extends downwardly toward the platform plate 152 sufficiently to prevent the target 42 from sliding off the platform plate, but the side 154 is spaced from the platform plate 152 sufficiently to allow the pick-up arm 132 of the throwing arm 46 to pass between the platform plate 152 and the forward side 154.

The throwing arm 46 rotates in the direction indicated in FIGURE 9. The pick-up arm 132 moves over the platform plate 152 while the main member 130 of the throwing arm 46 moves beneath the platform plate 152. The pick-up arm 132 contacts the target 42 and pushes it off the platform plate 152 onto the main member 130 of the throwing arm 46. The throwing arm 46 will then hurl the target during its rotational movement and come around again to pick up another target 42.

IV. *Gearing arrangement*

Shortly after the clay target 42 is delivered to the pick-up platform 44, the throwing arm 46 picks up the clay target from the pick-up platform 44 in the manner described hereinbefore and hurls it from the rear of the target throwing trap 30. Continuing its rotational movement the throwing arm will then pick up another target 42 having just been deposited on the pick-up platform 42 and repeat the cycle. The rotational movement of the throwing arm 46 is effected by the gearing arrangement 48, illustrated in detail in FIGURES 10–16.

Figure 10:
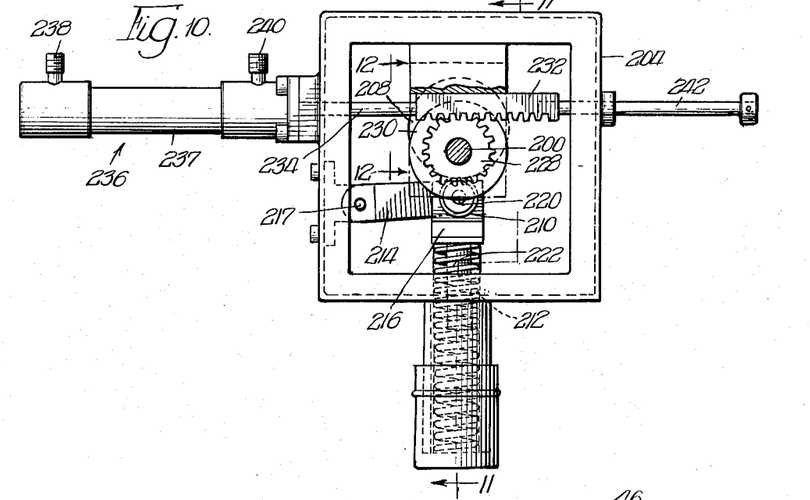
FIGURE 10 is a top view of the gearing arrangement of the target throwing trap shown in FIGURE 2.
Figures 11, 12:
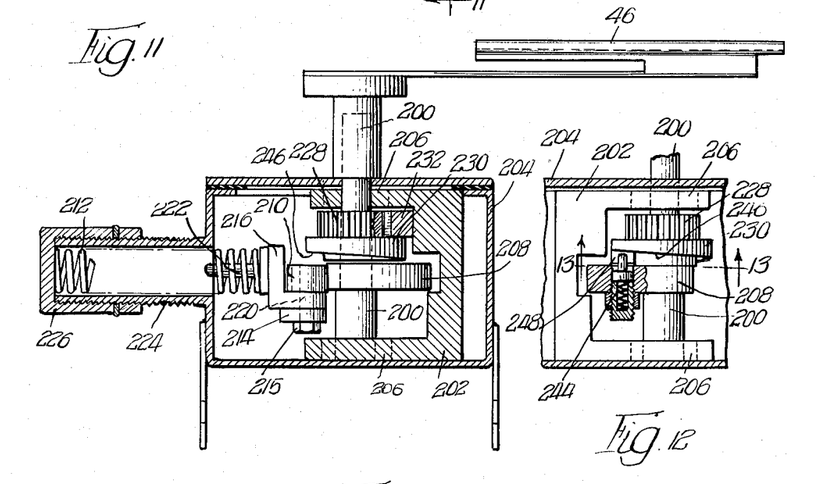
FIGURE 11 is a partial cross-sectional view of the gearing arrangement of FIGURE 10 with the throwing arm attached thereto, this view being taken along line 11—11 of FIGURE 10.
FIGURE 12 is a fragmentary cross-sectional view of the gearing arrangement of FIGURE 10, this view being taken along line 12—12 of FIGURE 10.

In a gear box 204 there is mounted a rotatable shaft 200 to which the throwing arm 46 is secured by means of collar 138. The shaft 200 is secured in position by a bracket 202 attached to the gear box 204. Ball bearing assemblies 206 held by the bracket 202 support the shaft 200 whereby there is a minimal frictional resistance to the rotation of the shaft 200. An eccentrically positioned circular cam 208 is secured to the shaft 200, its periphery being in contact with a follower 210.

The follower 210 is pivotally mounted upon a pin 220 having a rotatable head which is press fitted into the annular-shaped follower 210. The pin 220 extends through a hole in a horizontal leg of an L-shaped pressure means 216 and a hole in one end of a connecting arm 214. A nut 215 threadedly engages the free end of the pin 220 to secure the assembly. The connecting arm 214 is pivotally attached to the gear box 204 at 217 and likewise is free at the other end to pivot about the pin 220. The connecting arm 214 guides the follower 210 and assures that it will bear against the periphery of the cam 208.

A vertically disposed leg of the member 216 is acted upon by a spring 212 principally housed in a tubular section 224 of the gear box 204. The tubular section 224 has a threadedly engaging cap 226 which keeps the spring 212 in the tubular section 224. Rotation of the cap 226 increases or decreases the force exerted by the spring 212 upon the member 216, this force being transmitted through the pin 220 to the follower 210 and the cam 208. The L-shaped member is free to pivot about the pin 220.

A projection 222 from the vertically disposed leg of the member 216 extends into the spring 212 to prevent it from sliding off the member 216.

A gear member 228 with a spacer 230 secured thereto is rotatably mounted on the shaft 200. The gear 228 engages a rack 232 attached to the free end of a piston shaft 234 extending from a hydraulic piston arrangement, indicated generally by reference numeral 236. The rack is maintained in proper alignment with the gear 228 by a guide rod 242 attached thereto which slidably extends through a side of the gear box 204.

The hydraulic piston arrangement 236 comprises a cylinder 237 and a piston (not shown) which reciprocates within the cylinder 237. The piston is connected to the piston shaft 234. The cylinder is provided with inlets 238 and 240. When it is desired to move the piston to the right as viewed in FIGURE 10 the fluid under pressure enters the inlet 238 forcing the piston, piston shaft 234 and rack 232 to the right. The inlet 240 in such an instance serves to allow displaced fluid to leave the cylinder 237. Likewise, when the piston is to be moved toward the left as viewed in FIGURE 10 the fluid under pressure enters the inlet 240 and displaced fluid exits via the inlet 238. The hydraulic actuation system which controls the flow of fluid to the hydraulic piston arrangement 236 will be explained in more detail hereinafter.

Figure 13:
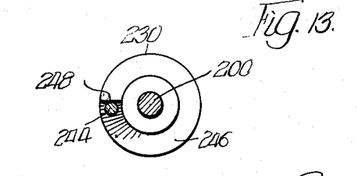
FIGURE 13 is a fragmentary view of the gearing arrangement taken along line 13—13 of FIGURE 12.

As seen in FIGURES 12 and 13, the cam 208 is provided with a spring-biased detent 244. The spacer member 230 has a bottom spiral inclined face 246, the ends of which form a step 248. The detent 244 rides upon the face 246 of the spacer 230. As will be more apparent hereinafter the cooperation of the step 248 with the detent 244 is the manner in which the gear 232 drives the shaft 200 and the throwing arm 46 through its cycle.

Figure 14:
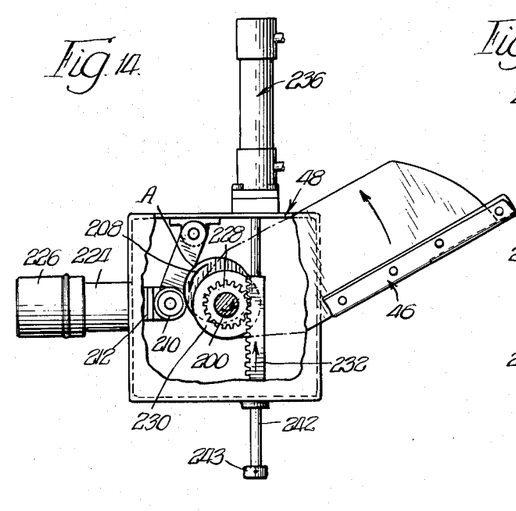
FIGURE 14 is a top view of the gearing arrangement of FIGURE 10 illustrating the position of its components as the throwing arm moves to pick-up the clay target.
Figure 15:
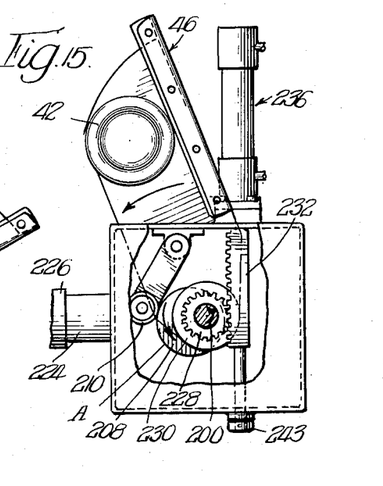
FIGURE 15 is a top view of the gearing arrangement of FIGURE 10 illustrating the position of its components as the throwing arm begins to throw the clay target.

The operation of the gearing arrangement 48 to cause the throwing arm 46 to pick up and throw a clay target 42 will be described in more detail with reference to FIGURES 14-16. Referring specifically to FIGURE 14 the throwing arm 46 and the gearing arrangement 48 are illustrated in their respective positions just after the throwing arm 46 has completed its throwing stage and is beginning the target pick-up stage. At this time the rack 232, actuated through the hydraulic piston arrangement 236, is beginning to move in the direction indicated by the arrow in FIGURE 14. The rack 232 causes the gear 228 to be rotated in a counterclockwise direction, as indicated by the arrow in FIGURE 14. The spacer 230, which is attached to the gear 228, is likewise rotated in a counterclockwise direction. The step 248 on the spacer 230 is in engagement with the dentent 224 causing the cam 208 to be rotated in a counterclockwise direction also. As the cam 208 is fixedly attached to the shaft 200, the throwing arm 46 is also rotated in a counterclockwise direction. The throwing arm 46 passes through the pick-up platform 44 and picks up the clay target 42 in the manner described hereinbefore. Simultaneously the counterclockwise movement of the eccentric cam 208 causes the follower 210 to compress the spring 212. The movement of the throwing arm 46, rack 232 and the other elements is relatively slow during tis target pick-up stage.

The movement of the rack 232 in the direction indictaed in FIGURE 14 is sufficient to cause the eccentric cam 208 to rotate counterclockwise just past the point wherein the spring 212 receives its maximum compression. As the cam 208 is eccentrically mounted upon the shaft 200 it has one point A on its periphery (see FIGURES 14 and 15) which is farther from the axis of the shaft 200 than any other point on the periphery of the cam 208. When this point A is contacting the follower 210 the spring 212 is under maximum compression. As soon as point A rotates in a counterclockwise direction past the follower 210, the spring 212 through the follower 210 urges the cam 208 to continue moving in the counterclockwise direction. This stage is illustrated in FIGURE 15 and is the beginning of the throwing stage.

The large force exerted by the spring-biased follower 210 upon the cam 208 during the throwing stage causes the cam 208 and shaft 200 to be rotaed very rapidly in a counterclockwise direction. This rapid rotation of the shaft 200 causes the throwing arm 46 to likewise rotate rapidly in a counterclockwise direction and to hurl the target 42 from the target throwing trap. The momentum of the cam 208 and the throwing arm 46 carry them counterclockwise substantially back to the position shown in FIGURE 14.

During the throwing stage however, the piston is actuated in the opposite direction causing the rack 232 to move in the direction indicated by the arrow in FIGURE 16. Therefore, during the throwing stage the throwing arm 46 and the cam 208 are traveling in a counterclockwise direction and the gear 228 and spacer 230, which may freely rotate about the shaft 200, are rotated by the rack 232 in the opposite direction. This compresses the detent 244 in the cam 208 which rides along the spiral face 246 of the spacer 230. In this manner the opposite rotation of the spacer 230 and the cam 208 brings the step 248 of the spacer 230 back to a position where the step 248 and detent 244 will again engage upon counterclockwise movement of the gear 228 during the target pick-up stage described hereinbefore. This cycle is repeated as required to continuously throw targets 42 from the target throwing trap 30.

Limit switches (not shown) are provided outside the gear box 204 so that when the rack 232 has completed the clockwise rotation of the gear 228 and the detent 244 and step 248 are again abutting, the movement of the rack 232 is reversed by the hydraulic piston arrangements 236 to effect the pick-up and throwing stages described hereinbefore. Contact with these limit switches is made by a collar 243 on the guide arm 242.

V. *Hydraulic actuation system*

Figure 17:
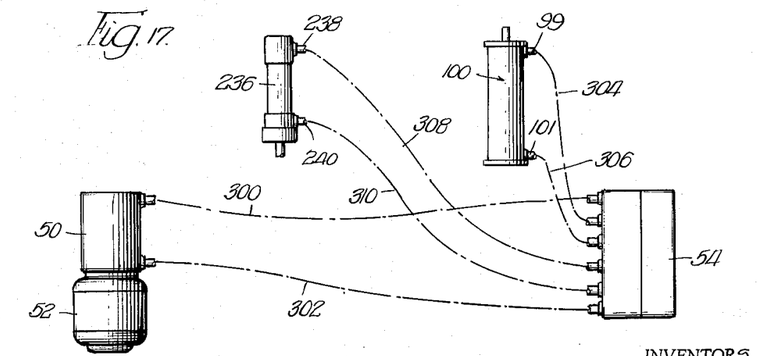
FIGURE 17 is a schematic diagram of the fluid actuation system of the target throwing trap of FIGURE 1.

The hydraulic actuation system for the target throwing trap 30 is illustrated schematically in FIGURE 17. The motor 52 drives the pump 50 having a discharge line 300 and an intake line 302. The liquid under the desired pressure is pumped to a central valving arrangement 54 which communicates with the inlets 99 and 101 of the hydraulic piston arrangement 100 via lines 304 and 306, respectively, and with inlets 238 and 240 of the hydraulic piston arrangement 236 via lines 308 and 310, respectively.

The valving arrangement 54 is operable to supply the hydraulic liquid under pressure to either or both of the hydraulically operated piston arrangements 236 and 100. If the inlet 99 is being supplied, the valving arrangement 54 assures that the displaced fluid from inlet 101 is passed through the line 302 back to the pump 50 and vice versa. Likewise if fluid is being distributed to the inlet 238, the displaced fluid from 240 will pass via line 310 and the valving arrangement 54 to line 302 to be returned to the pump 50 and vice versa. In this manner only one pump is necessary to control the two reversible hydraulically operated piston arrangements 100 and 236.

Standard electrical timing systems are employed in the target throwing trap 30 to coordinate the movements of all the components by means of the valving arrangement 54. As indicated before these may be actuated by coin-operated systems. These electrical systems are not part of the present invention, but one advantage of the target throwing trap of this invention is the ease with which it is automatically operated by conventional electrical timing systems, since one central valving arrangement controls the movements of its components.

It will be understood that the angle of inclination of the gearing arrangement 48 and thereby the angle of inclination of the throwing arm 46 may be adjusted to change the trajectory of the clay target.

Furthermore, it will be understood that a pneumatic actuation system may be employed rather than a hydraulic actuation system by merely substituting a suitable compressor for the pump 50.

It will be further understood that the target throwing trap 30 of the present invention may be employed to throw regular-sized clay targets, though the target throwing trap of the present invention is most advantageously employed in a reduced scale shooting gallery operating indoors.

While several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A target throwing trap comprising means for feeding a single target to a pick-up platform, a throwing arm for picking up and hurling said target from said pick-up platform, means connecting said throwing arm to a gearing arrangement, oscillating means driving said gearing arrangement and said throwing arm, said oscillating means including a reciprocating member connected to said gearing arrangement and fluid drive means to move said reciprocating member in opposite directions, said drive means moving said reciprocating member in one direction to drive said gearing arrangement and throwing arm whereby said throwing arm picks up and hurls said target trap and said drive means moving said reciprocating member in the opposite direction after driving said throwing arm.

2. A target throwing trap comprising means for feeding a single target to a pick-up platform, a throwing arm for picking up and hurling said target from said pick-up platform and an oscillating means to drive said throwing arm, said throwing arm being connected to a gearing arrangement actuated by said oscillating means, said gearing arrangement including a rotatable shaft connected to said throwing arm, said rotatable shaft having an eccentric cam mounted thereon, a spring-biased follower contacting the periphery of said cam, and a gear mounted on and rotatable upon said shaft, said oscillating means including a rack meshing with said gear and means to reciprocate said rack to cause said gear to rotate, said gear contacting said cam and driving said shaft when said rack is moved in one direction and rotating freely about said shaft when said rack is moved in the opposite direction.

3. A target throwing trap comprising means for feeding a single target to a pick-up platform, a throwing arm for picking up and hurling said target from said pick-up platform and an oscillating means to drive said throwing arm, said platform comprising a platform member to which said single target is fed, said throwing arm having a main body member and a pick-up arm member, said pick-up arm member and said main body member being attached and forming a slot therebetween so that said main body member may pass below said platform member while said pick-up arm member is passing above said platform member, said pick-up arm member taking said single target off of said platform member and placing it on said main body member, said platform member sloping downwardly toward a vertical extending front member of said platform, said front member and said platform member being spaced from one another a distance less than the thickness of said single target and greater than the height of said pick-up arm member, said slot between said pick-up arm member and said main body member being greater than the thickness of said platform member, said pick-up arm member passing through the space between said platform member and said front member as said pick-up arm member is taking said single target off of said platform member.

4. The target throwing trap of claim 2 wherein said means to feed a single target to a pick-up platform comprises a magazine, said magazine being rotatably mounted upon a base, said base having an opening therein communicating with said pick-up platform, means connected to said magazine to store stacks of said targets, a pivotally mounted driving arm engaging said magazine, drive means connected to said driving arm, means to reciprocate said drive means whereby said magazine is successively rotated to align one stack of targets at a time with said opening in said base, means to prevent more than one of the targets in said stack from dropping through said opening in said base onto said pick-up platform, a spring-based catch member attached to said driving arm, a plate having holes therein secured to said magazine, said spring-biased catch member engaging one of said holes when said driving arm moves to rotate said magazine.

5. The target throwing trap of claim 3 wherein said means to feed a single target to a pick-up platform comprises a magazine, said magazine being rotatably mounted upon a base, said base having an opening therein communicating with said pick-up platform, means connected to said magazine to store stacks of said targets, a pivotally mounted driving arm engaging said magazine, drive means connected to said driving arm, means to reciprocate said drive means whereby said magazine is successively rotated to align one stack of targets at a time with said opening in said base, means to prevent more than one of the targets in said stack from dropping through said opening in said base onto said pick-up platform, a spring-biased catch member attached to said driving arm, a plate having holes therein secured to said magazine, said spring-biased catch member engaging one of said holes when said driving arm moves to rotate said magazine.

References Cited by the Examiner

UNITED STATES PATENTS

| | | | |
|---|---|---|---|
| 859,123 | 4/1907 | Leggett | 124—43 |
| 1,179,329 | 4/1916 | La Pointe | 74—84 |
| 1,369,948 | 3/1921 | Vickery. | |
| 1,402,617 | 1/1922 | Jordan | 74—84 |
| 1,639,596 | 8/1927 | Dritz. | |
| 2,026,188 | 12/1935 | Parrish | 124—20 |
| 2,146,066 | 2/1939 | Gorney. | |

(Other references on following page)

UNITED STATES PATENTS

| | | | |
|---|---|---|---|
| 2,237,678 | 4/1941 | Lohr et al. | |
| 2,310,746 | 2/1943 | Parker et al. | 124—8 |
| 2,626,596 | 1/1953 | Lyon | 124—8 |
| 2,827,036 | 3/1958 | Ervine et al. | 124—47 |
| 2,928,383 | 3/1960 | Ohlson | 124—8 |
| 2,934,056 | 4/1960 | Lauterbach | 124—9 |
| 2,989,045 | 6/1961 | Hodge et al. | 124—48 X |
| 2,994,313 | 8/1961 | Grahn | 124—6 |
| 2,996,058 | 8/1961 | Ervine | 124—8 |
| 3,088,452 | 5/1963 | Foster | 124—47 X |
| 3,108,582 | 10/1963 | Darrell | 124—47 X |
| 3,119,383 | 1/1964 | Foster | 124—9 |

RICHARD C. PINKHAM, *Primary Examiner.*

JAMES W. LOVE, *Examiner.*